US007503444B2

(12) United States Patent
Bohan

(10) Patent No.: US 7,503,444 B2
(45) Date of Patent: Mar. 17, 2009

(54) SHAPE MEMORY ALLOY ROTARY ACTUATOR WITH CAPACITIVE POSITION FEEDBACK

(75) Inventor: Stephen M. Bohan, Potterville, MI (US)

(73) Assignee: BorgWarner Inc., Auburn Hills, MI (US)

( * ) Notice: Subject to any disclaimer, the term of this patent is extended or adjusted under 35 U.S.C. 154(b) by 272 days.

(21) Appl. No.: 11/307,807

(22) Filed: Feb. 23, 2006

(65) Prior Publication Data

US 2006/0237277 A1    Oct. 26, 2006

Related U.S. Application Data

(60) Provisional application No. 60/674,863, filed on Apr. 26, 2005.

(51) Int. Cl.
*F16D 35/02* (2006.01)

(52) U.S. Cl. ............. 192/58.61; 192/82 T; 251/129.06; 123/41.12

(58) Field of Classification Search ............... 192/58.61
See application file for complete search history.

(56) References Cited

U.S. PATENT DOCUMENTS

| 4,965,545 | A  | * | 10/1990 | Johnson ....................... 337/140 |
| 5,584,371 | A  | * | 12/1996 | Kelledes et al. ........... 192/58.61 |
| 7,178,648 | B2 | * | 2/2007  | Barnum et al. ............ 192/58.61 |
| 2004/0068985 | A1 | * | 4/2004 | Mernoe ....................... 60/527 |
| 2007/0119677 | A1 | * | 5/2007 | Barnum et al. ........... 192/58.61 |

* cited by examiner

*Primary Examiner*—Richard M. Lorence
(74) *Attorney, Agent, or Firm*—John A. Artz

(57) ABSTRACT

An engine mounted fan clutch is disclosed that utilizes an actuator including two shape memory alloy actuation wires to engage and disengage a valve arm and ultimately the fan. The actuator also includes a controller and a position sensor to accurately determine the position of a valve arm. The fan clutch is part of a control system that continuously monitors the engine parameters and makes adjustments to keep the engine temperature within an acceptable range.

24 Claims, 5 Drawing Sheets

$$V_o \approx - \frac{C(x)}{Cf} * Vs \quad \text{—} 122$$

SHAPE MEMORY ALLOY ROTARY ACTUATOR WITH CAPACITIVE POSITION FEEDBACK

CROSS-REFERENCE TO RELATED APPLICATIONS

The present invention claims priority from U.S. Provisional Application Ser. No. 60/674,863, entitled "Shape Memory Alloy Rotary Actuator With Capacitive Position Feedback", filed Apr. 26, 2005.

TECHNICAL FIELD

The present invention relates generally to an engine mounted fan clutch and more particularly to an engine mounted fan clutch that uses a fluid to engage and disengage the clutch to modulate the speed of the fan.

BACKGROUND OF THE INVENTION

Today's trucks and sport utility vehicles (SUVs) require more cooling power than can be provided by electrically provided fans. In order to meet their cooling needs most automotive manufacturers utilize a viscous fan clutch to transmit power from the engine to the fan. A viscous fan clutch works by using a viscous fluid to create a mechanical link between two independent parts of the clutch, the clutch plate that is connected to a pulley powered by the engine and the fan drive body that is connected to the fan. To engage the clutch and bring the fan up to the speed of the pulley, fluid is released by a valve into an area between the clutch plate and the body. The fluid causes the two parts to drag together and the fan speed to increase. To disengage the fan clutch and reduce the fan speed, the valve is closed and the centrifugal force caused by the spinning of the fan drive causes the fluid to pump out of the area between the clutch plate and the body.

Typically either a bimetal coil or a magnetic actuator actuates the valve. There are advantages and disadvantages for both systems. The benefits of the bimetal coil include decreased cost, ease of implementation and decreased weight over the magnetic actuator. The magnet actuator has the benefit of computer control. This is not the case with the bimetal actuator. With the bimetal actuator the heat coming off of the radiator actuates the bimetal clutch. As such it can only be actuated based on one input, radiator temperature, while the magnetic actuator can be controlled by multiple inputs.

Therefore, there is a need to have a clutch with the controllability of the magnetically actuated clutch and also the size and cost benefits of the bimetal actuator.

SUMMARY OF THE INVENTION

It is therefore an object of the present invention to provide a relatively small and lightweight actuator assembly with increased controllability. The present invention provides for an actuator that includes a control system that interprets input from a variety of sensors, processes the information, and instructs various components to adjust parameters accordingly.

The proposed invention consists of an actuator for a viscous fan clutch including two shape memory alloy actuation wires for controlling the position of the valve arm and a position sensor to detect the specific position of the valve arm. The present invention provides for a relatively compact actuator, while at the same time, providing for a feedback loop with increased controllability.

In accordance with the objects of the present invention, the components for the actuator includes a controller, a current source in communication with the controller, a valve arm that controls the flow of the viscous fluid, a valve shaft connected to the valve arm, a valve arm position sensor attached to the valve shaft, first and second shape memory alloy actuation wires that are attached to the valve shaft and to current source. As the two shape memory alloy actuation wires are subjected to varying electrical currents it causes the valve shaft to rotate to a position in a range of positions between the valve arm fully closed position and the valve arm fully opened position.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
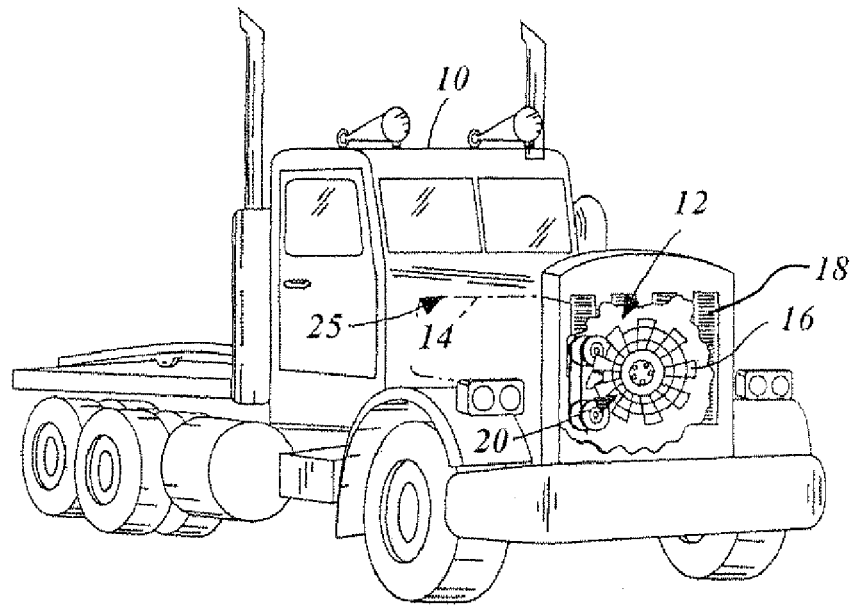
FIG. 1 is a perspective view of a vehicle utilizing an engine mounted fan clutch in accordance with an embodiment of the present invention.

In the following figures the same reference numerals will be used to refer to the same components. Further, various operating parameters and components are described for one constructed embodiment. These specific parameters and components are included as examples and are not meant to be limiting.

Also, in the following description various fan drive components and assemblies are described as an illustrative example. The fan drive components and assemblies may be modified depending upon the application.

Referring now to FIG. 1, a perspective view of a vehicle 10 utilizing a fluidically controlled fan drive system 12 in accordance with an embodiment of the present invention is shown. The system 12 uses rotational energy from a liquid cooled engine 14 to turn a radiator-cooling fan 16 to provide airflow through a radiator 18. The system 12 includes a clutch assembly 20, which is coupled to and rotates relative to a input shaft of the engine 14. The system is contained within the engine compartment 25 of the vehicle.

Figure 4:
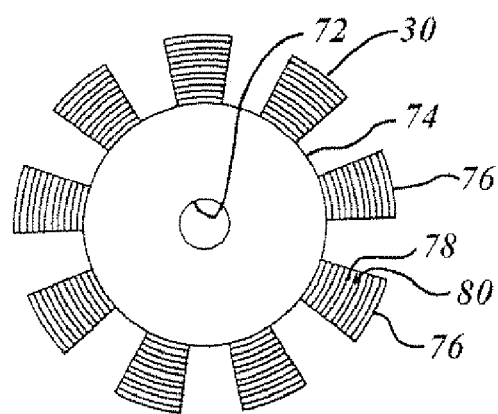
FIG. 4 is a top view of a capacitive plate used in the position sensor.
Figure 2:
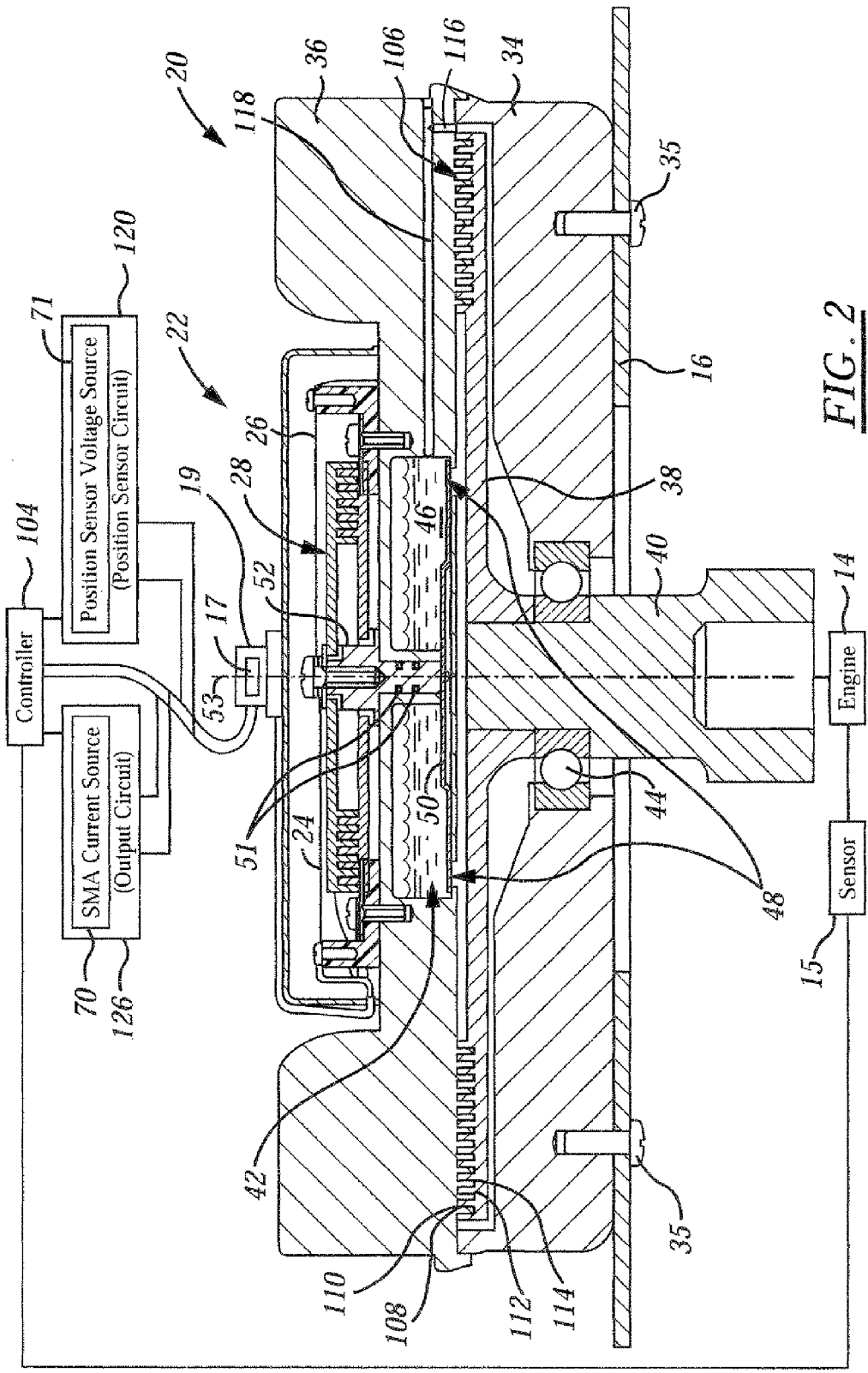
FIG. 2 is a cross-sectional view of a clutch assembly in accordance with an embodiment of the present invention.
Figure 3:
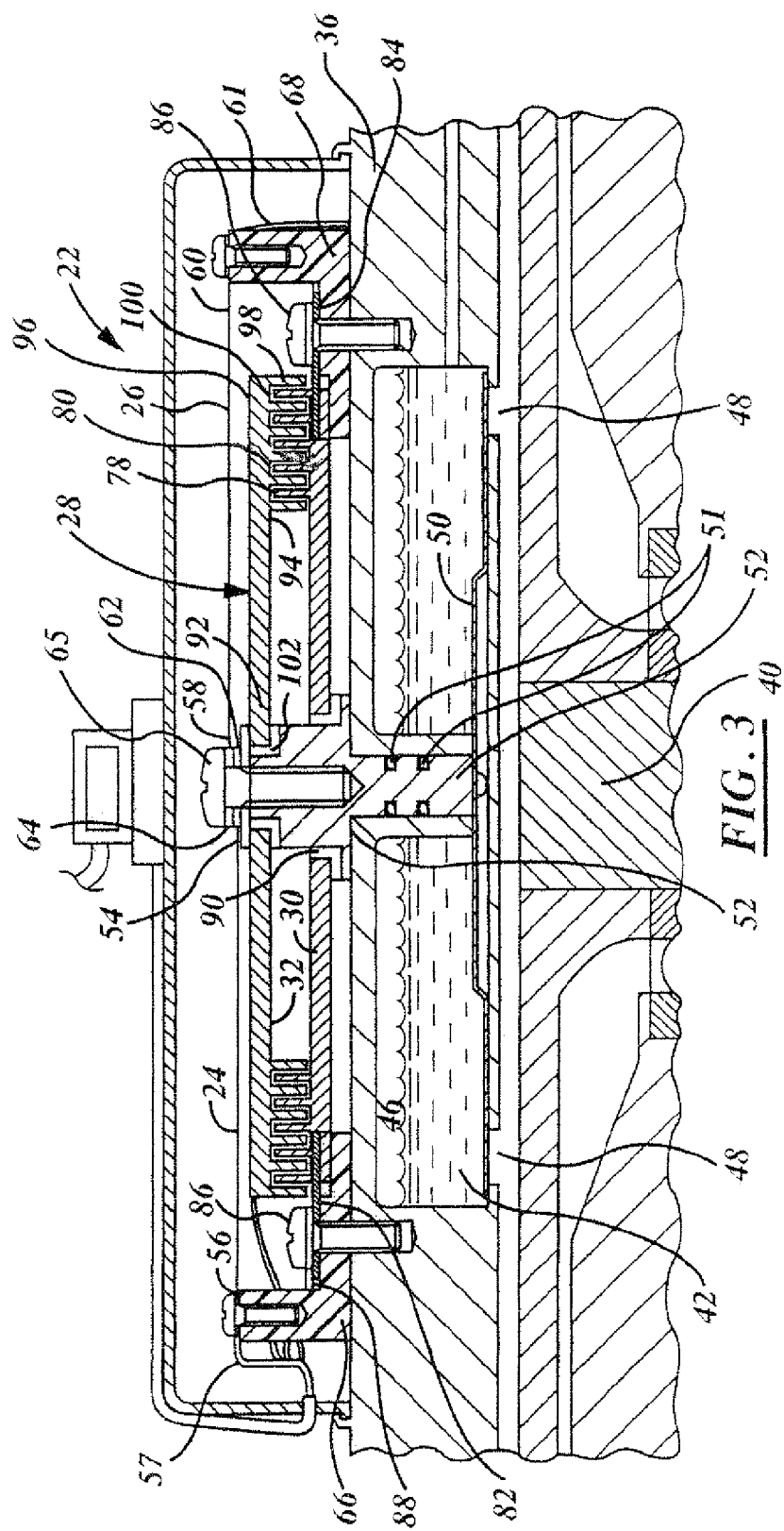
FIG. 3 is a cross-sectional view of the actuator for the fan drive in accordance with an embodiment of the present invention.
Figures 5, 5A:
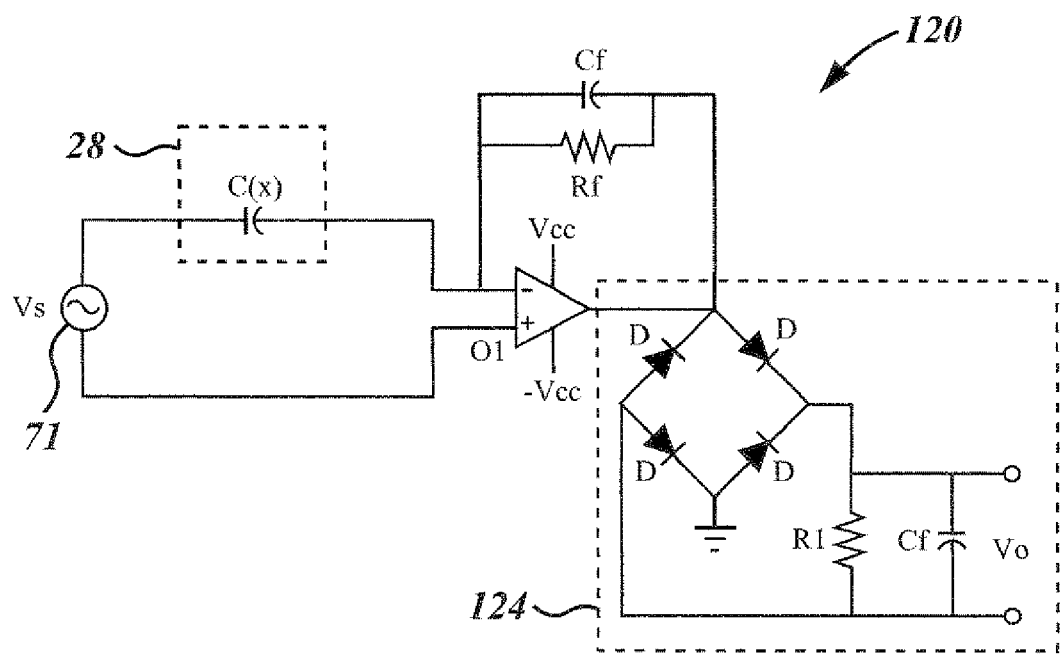
FIG. 5 illustrates an embodiment of the position sensor circuit and an FIG 5A illustrates equation representing voltage output of the circuit.

In summary, FIG. 2 illustrates a cross-sectional view of the viscous fan clutch assembly 20 having a valve arm actuator 22 that utilizes a set of shape memory alloy actuation wires 24, 26 in accordance with an embodiment of the present invention. FIG. 3 specifically illustrates the valve arm actuator 22 including the shape memory alloy actuation wires 24, 26 and the components comprising the position sensor 28. FIG. 4 illustrates a top view of a capacitive plate 30 of the position sensor 28. FIG. 5 illustrates one embodiment of a position sensor circuit. As will be described further below, a method of using the viscous fan clutch assembly is disclosed in the present invention as presented in FIG. 6.

FIGS. 2 and 3 illustrate a viscous fan clutch in accordance with an embodiment of the present invention illustrated generally at 20. A valve actuator for actuating a fan to cool an engine in accordance with an embodiment of the present invention is illustrated generally at 22. The system is part of and regulated by a control loop that further includes a controller 104 that monitors the temperature of the engine 14 and controls the flow of viscous fluid 42 by the valve arm 50 to obtain a desired rotational fan speed.

More specifically, the controller 104 is in communication with a number of different sensors 15 to determine the engine's temperature and other various parameters. The sensors can include, but are not limited to, an engine temperature sensor and an air conditioner (A/C) head pressure sensor. Based on this information the controller 104 will determine a desired fan 16 speed. A fan speed error is determined and used to calculate the desired valve arm 50 position. The actual valve arm position is measured and communicated to the controller 104. A valve arm error is calculated. The valve position error is used to determine how much current to send to each shape memory alloy (SMA) wire. A current source sends current to each SMA wire and their respective lengths change. The valve arm 50 will either open more or close more. The valve arm rotates about axis of rotation 53. If the valve arm opens more, more fluid 42 is allowed to flow into the work area 106 and the fan speed will increase. On the other hand, if the valve arm 50 closes more, less fluid 42 is allowed to flow into the work area 106 and the fan speed will decrease. The system will continuously monitor engine parameters and perform this control system.

The fan clutch assembly 20 includes a valve arm actuator 22 utilizing two shape memory alloy actuation wires 24, 26 that control the speed of rotation of the fan 16, a fan drive body 34 and cover 36 that are connected to and rotate with the fan 16, a clutch plate 38 that is connected to and rotates with the input shaft 40 and engine 14, and a viscous fluid 42 that flows between the clutch plate 38 and fan drive cover 36 to engage the fan 16 at a particular speed of rotation.

The clutch plate 38 is constantly rotating at approximately the speed of the input shaft 40, which in turn is constantly rotating at approximately the speed of the engine 14 multiplied by the pulley ratio if it is not crankshaft mounted. When the fan 16 is engaged with the clutch plate 38 it is forced to rotate and cool the engine 14 of the vehicle 10. However, in the scenario where the fan 16 is disengaged from the clutch plate 38 it is running much slower than the engine speed multiplied by the pulley ratio, but it does not completely stop rotating. It is important to note that the fan 16 can maintain and most likely will maintain a rotational speed at a value in the range between zero (0) revolutions per minute (RPM) and approximately the rotational speed of the input shaft.

The fan 16 is attached to the fan drive body 34, which is attached to the fan drive cover 36. All three of these components are fixedly attached to each other so that they rotate at the same speed. FIGS. 2 and 3 illustrate bolts 35 which connect the fan 16 to the fan drive body 34. The fan drive body 34 is positioned around the input shaft 40 but has the ability to rotate at a different speed due to a bearing 44 that is positioned between the input shaft 40 and the fan drive body 34.

The fan drive cover 36 contains and defines a fluid reservoir 46 where the viscous fluid 42 is stored. There is at least one fill hole 48 from the reservoir 46 through which the viscous fluid 42 may flow. The fill hole 48 is also referred to as a fill port. FIG. 2 illustrates two fill ports 48 however the invention is not limited to that specific number.

In general terms the actuator 22 controls the flow of the viscous fluid 42 from the reservoir 46 through the fill port 48. The actuator 22 includes a valve arm 50 that travels between a fully closed position, in which it is covering the fill hole 48 and preventing the viscous fluid 42 from traveling through the fill hole 48, and a fully opened position, in which it is not covering the fill hole 48 and allows the viscous fluid 42 to travel through the unobstructed fill hole 48. Further, the valve arm has the ability to stop in any position between the fully closed and fully opened positions to more accurately control the flow of viscous fluid and ultimately the rotational speed of the fan.

The actuator 22 includes a first shape memory alloy (hereinafter referred to as "SMA") actuation wire 24, a second SMA actuation wire 26, and a valve shaft 52 to which the valve arm 50 is attached. The SMA actuation wires 24, 26 are connected to and force rotation of the valve shaft 52. The valve shaft 52 rotates about axis of rotation 53. Also connected to the valve shaft is a position sensor 28 that determines the position of the valve arm. The position sensor 28 detects the position of the valve arm 50 by utilizing a set of capacitive plates, one stationary capacitive plate 30 and one rotating capacitive plate 32. The valve arm 50 and the rotating plate 32 are fixedly connected to the valve shaft 52 so that they rotate in sync with each other.

The two SMA activation wires 24, 26 could be made from any number of materials, including, but not limited to FLEXINOL™ having a diameter of 0.015 inches. In one embodiment the SMA wires 24, 26 have a 1.5 Ampere current draw. The first SMA actuation wire 24 has a first end 54 and a second end 56. Similarly, the second SMA actuation wire 26 has a first end 58 and a second end 60. The first ends 54,58 of both the first SMA actuation wire 24 and the second SMA actuation wire 26 are connected to the valve shaft 52. The first end 54 of the first SMA actuation wire 24 is attached to a first ring terminal 62 that is attached to the valve shaft 52 and the first end 58 of the second SMA actuation wire 26 is attached to a second ring terminal 64 that is attached to the valve shaft 52. The ring terminals are illustrated in FIGS. 2 and 3 as being attached to the valve shaft by a bolt 65. However, other means of attachment could be used.

The second end 56 of the first SMA actuation wire 24 is connected to a mounting post 66. The second end 60 of the second SMA actuation wire 26 is connected to a second mounting post 68 that is positioned approximately 180 degrees from the second end 56 of the first SMA actuation wire 24 or the first mounting post 66. The mounting posts 66, 68 are made from a non-conductive material and are attached to the fan drive cover 36. In one embodiment, they are bolted using a nonconductive bolt 86 to the cover 36, however other means of attachment could be utilized. The second end 56 of the first SMA actuation wire 24 is connected by a wire 57 to the SMA current source 70 and the second end 60 of the second SMA actuation wire 26 is also connected by a wire 61 to the SMA current source 70.

Both of the SMA actuation wires 24, 26 have a disengaged length when not subjected to an electrical current and an engaged length when subjected to an electrical current. The engaged length is less than the disengaged length. In other words, the SMA actuation wire will decrease in length when subjected to an electrical current.

There is an output circuit 126 that controls the current source 70 for the SMA actuation wires 24, 26. More specifically, the output circuit 126 uses a pulse width modulated signal (PWM) to control the two SMA wires. The actuation scheme takes a duty cycle at a given frequency and applies it to one wire. The inverse duty cycle is applied to the other wire. This keeps both wires in tension at all times and draws constant current.

The position sensor 28 has the ability to detect the position of the valve arm 50 and communicate this value to the controller 104. This is accomplished by using a set of capacitive plates, one stationary 30 and one rotating 32 relative to the stationary 30, wherein one of the plates is sourced and the other is sensed to create a capacitance. In FIGS. 2 and 3 the rotating capacitive plate is sourced and the stationary capacitive plate is sensed, however, it could be wired in the opposite configuration.

The rotating capacitive plate 32 has the ability to move between a fully disengaged position and a fully engaged position. The fully engaged position is rotated between a maximum of 13.5 and 35 degrees from the fully disengaged position. In one embodiment, the fully engaged position is 20 degrees from the fully disengaged position. In the fully disengaged position, the valve arm is completely covering the fill port and therefore the fan is rotating at a relatively low rotational speed. In the fully engaged position, the valve arm is rotated such that the fill hole is completely unobstructed by the valve arm and therefore the fan is completely engaged with the clutch 38 and rotating at a relatively high rotational speed.

The embodiment illustrated in FIGS. 2 and 3 shows the stationary capacitive plate 30 positioned between the fan drive cover 36 and the rotating capacitive plate 32, however in an alternative embodiment the rotating capacitive plate 32 could be positioned between fan drive cover 36 and the stationary capacitive plate 30.

Referring to FIG. 4, the stationary capacitive plate 30 is generally circular in shape having a center aperture defined by an inner perimeter 72, and an outer perimeter 74. There are nine (9) evenly spaced flaps 76 positioned around the outer perimeter 74 of the plate 30. Each flap 76 includes a set of axially extending lands 78 and grooves 80 that are positioned radially with respect to the outer perimeter 74 of the plate 30.

Further, the stationary capacitive plate 30 is held in a stationary position by two retaining tabs, a first retaining tab 82 and a second retaining tab 84, that are attached to the stationary capacitive plate 30 positioned in the range of 175 degrees to 185 degrees from each other. The first tab 82 is secured to the first mounting post 66 and the second tab 84 is secured to the second mounting post 68. In the embodiment shown, the tabs are bolted using a nonconductive bolt 86 to the mounting posts 66, 68 and the fan drive cover 36, however, other means of attachment may be used. Both retaining tabs 82, 84 are made from a conductive material. The first retaining tab 82 is connected by wire 88 to a position sensor voltage source 71. A bushing 90 is positioned between the inner perimeter 72 of the stationary plate 30 and the valve shaft 52. The bushing 90 is made from a non-conductive material to insulate the stationary plate from the valve shaft.

The rotating capacitive plate 32 is also generally circular having a center aperture defined by an inner perimeter 92, and an outer perimeter 94. The rotating capacitive plate 32 also includes nine (9) evenly spaced flaps 96 around the outer perimeter 94 that are aligned with the nine evenly spaced flaps 76 around the stationary capacitive plate 30. Each flap 96 on the rotating capacitive plate 32 includes a set of axially extending lands 98 and grooves 100 that are positioned radially with respect to the outer perimeter 94 and are positioned to rotate between the lands 78 and grooves 80 in the stationary capacitive plate 30.

A non-conductive bushing 102 is positioned between the inner perimeter 92 of the rotating capacitive plate 32 and the valve shaft 52. A range of capacitance values is created depending upon the position of the rotating plate 32 with respect to the stationary plate 30. These values are used to determine the position of the valve arm 50 since the rotating plate 32 and the valve arm 50 are fixedly connected and rotate in sync with each other.

FIG. 5 illustrates a position sensor circuit 120 in accordance with an embodiment of the present invention. The circuit translates the capacitance into an analog signal. An op-amp circuit based on an inverting amplifier was used to interpret the position. The capacitor is excited with a high frequency sinusoidal signal. After the sine wave is passed through the capacitor it is fed into an inverting amplifier to create an output, Vo, proportional to the variable capacitance $C(x)$ as illustrated in the equation in FIG. 5A. The signal must be converted to a dc signal to be read by the controller. Therefore, to change the varying amplitude of the sine wave output from the amplifier into a dc signal a full bridge rectifier 124 is included in the circuit. The filter section of the rectifier minimizes ripple voltage on the output. The equation representing the circuit is illustrated at 122.

The fan drive cover 36 includes a set of lands 108 and grooves 110 that are aligned with and move between a set of lands 112 and grooves 114 on the clutch plate 38. This area defined by the lands 108, 112 and grooves 110, 114 of both components is the work area 106. In the scenario where the fan 16 is disengaged there is a minimal amount of viscous fluid in the work area 106. However, when the fan 16 is actuated and the viscous fluid 42 is allowed to flow to the work area 106 it creates drag between the clutch plate 38 and the fan drive cover 36. When the fan is completely engaged, this drag forces the fan drive cover 36 to rotate at approximately the speed that the clutch plate 38 is rotating. Since the fan drive cover 36, the fan drive body 34 and the fan 16 are all attached together, this engagement causes the fan 16 to engage and rotate at approximately the same speed as the clutch plate 38.

During engagement of the fan 16 the viscous fluid 42 flows freely from the reservoir 46 out through the fill hole or port 48 toward and through the work area 106. Upon exiting the work area 106 the fluid travels through a scavenge port 116 and back to the reservoir 46 through a fluid return path 118. So long as the valve arm 50 is in the open or engaged position the fluid 42 will continue to flow through this path creating drag in the work area 106 forcing the fan 16 to continue rotating at an elevated speed. The valve shaft 52 includes at least one O-ring 51 to prevent the viscous fluid 42 from leaking up the valve shaft 52 and into the area containing the capacitive plates 30, 32.

Figure 6:
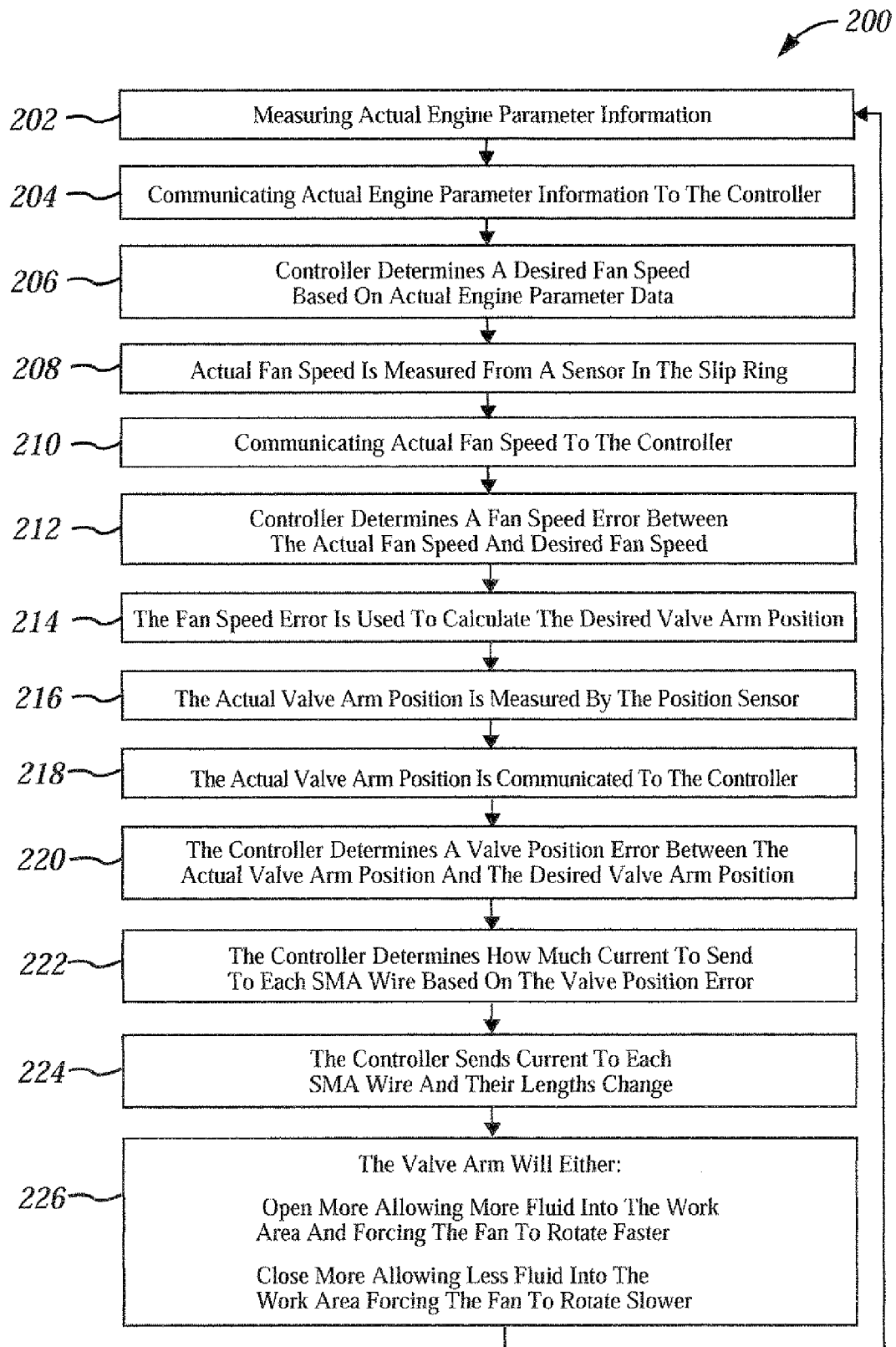
FIG. 6 is a flowchart illustrating a method in accordance with an embodiment of the present invention.

FIG. 6 illustrates a method of actuating a viscous fan clutch 12 with two shape memory alloy actuation wires 24, 26 shown generally at 200. Actual engine parameter information is measured using at least one sensor 15 at 202. The sensor or sensors 15 used detect various vehicle parameters that are representative of the vehicle's engine temperature. The sensor 15 communicates the actual engine parameter information to the controller 104 at 204. The controller 104 determines a desired fan speed based on the actual engine parameter data at 206. The actual fan speed is measured from a fan speed sensor 17 at 208. The fan speed sensor 17 could be located in the slip ring 19 but is not limited to that location. The actual fan speed is communicated to the controller 104 at 210. The controller 104 will then determine a fan speed error between the actual fan speed and desired fan speed, at 212. The fan speed error is used to calculate the desired valve arm position at 214. The actual valve arm position is measured by the position sensor 28 at 216 and communicated to the controller 104 at 218. The controller 104 determines a valve position error between the actual valve arm position and the desired valve arm position at 220. Based on that information, the controller 104 determines how much current to send to each SMA wire 24, 26 based on the valve position error, at 222. The controller 104 causes a current to be sent to each SMA wire 24, 26 and their respective lengths change, at 224, causing the valve arm 50 to either open more or close more at 226. Of course, if the valve arm 50 opens more it allows more viscous fluid 42 into the work area 106 and forces the fan 16 to rotate faster. On the other hand, if the valve arm 50 closes more it allows less fluid 42 into the work area 106 and forces the fan 16 to rotate more slowly. The engine parameters continue to be monitored and adjustments made to the valve arm position according to the control loop.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An actuator for actuating a fan to cool an engine in an engine mounted viscous fan clutch wherein the fan clutch includes a work area, and a viscous fluid that is contained within a fluid reservoir and flows through the work area during engagement of the clutch and is prevented from flowing through the work area during disengagement of the clutch, the actuator comprising:
   a controller;
   a current source capable of transmitting varying electrical currents wherein said current source is connected to and in communication with said controller;
   a valve arm that controls the flow of the viscous fluid between the reservoir and the work area of the clutch and is moveable in the range between a closed position and an open position, wherein in said closed position the viscous fluid is retained within the reservoir and wherein in said open position the viscous fluid flows out from the reservoir to the work area;
   a valve shaft connected to said valve arm;
   a position sensor for detecting the position of said valve arm, said position sensor including a stationary capacitive plate and a rotating capacitive plate fixedly attached to and moveable with said valve arm, and wherein said position sensor is in communication with said controller; and
   a first shape memory alloy actuation wire having a first end and a second end, said first end is connected to said valve shaft and said second end is connected to said current source, and wherein said first shape memory alloy actuation wire is moveable between an activated length and a deactivated length; and
   a second shape memory alloy actuation wire having a first end and a second end, said first end is connected to said valve shaft and said second end is connected to said current source and is positioned in the range of 175 degrees –185 degrees from said second end of said first shape memory alloy actuation wire, and wherein said second shape memory alloy actuation wire is moveable between an activated length and a deactivated length;
   wherein when said first shape memory alloy actuation wire is subjected to an electrical current it is forced into its said activated state and wherein said second shape memory alloy actuation wire is subjected to an electrical current it is forced into its said activated state and varying electrical currents to said first and second shape memory alloy actuation wires force said valve shaft to rotate to a position in a range of positions between the valve arm closed position and the valve arm open position.

2. The actuator of claim 1 further comprising an engine temperature sensor in communication with said controller.

3. The actuator of claim 2 further comprising a fan speed sensor connected to said fan and in communication with said controller.

4. The actuator of claim 3 further comprising a position sensor circuit connected to said position sensor and said controller to determine the position of the valve arm and input the position of the valve arm to said controller.

5. The actuator of claim 4 further comprising a position sensor voltage source connected to and in communication with said position sensor and said controller.

6. The actuator of claim 5 wherein said activated length of said first shape memory alloy actuation wire is less than its said deactivated length and said activated length of said second shape memory alloy actuation wire is less than its said deactivated length.

7. The actuator of claim 6 further comprising a first mounting post to which said second end of said first shape memory alloy actuation wire is attached and a second mounting post to which said second end of said second shape memory alloy actuation wire is attached, wherein said first mounting post and said second mounting post are made from a non-conductive material.

8. The actuator of claim 7 wherein said valve arm covers a fill hole in the reservoir during disengagement of the clutch and said valve arm rotates to the open position to open the fill hole in the reservoir during engagement of the clutch.

9. The actuator of claim 8 wherein said stationary capacitive plate is generally circular having a center aperture defined by an inner perimeter and having an outer perimeter and nine evenly spaced flaps around said outer perimeter, wherein each flap includes a set of axially extending lands and grooves that are positioned radially with respect to said outer perimeter.

10. The actuator of claim 9 wherein said rotating capacitive plate is generally circular having a center aperture defined by an inner perimeter and having an outer perimeter and nine evenly spaced flaps around said outer perimeter that are aligned with said nine evenly spaced flaps around said stationary capacitive plate, wherein each flap on said rotating capacitive plate includes a set of axially extending lands and grooves that are positioned radially with respect to said outer perimeter and are positioned to rotate between said lands and grooves in said stationary capacitive plate.

11. The actuator of claim 10 further comprising a non-conductive bushing positioned between said inner perimeter of said stationary capacitive plate and said valve shaft, a first conductive tab and a second conductive tab wherein each tab is attached to said stationary capacitive plate and positioned in the range of 175 degrees to 185 degrees from each other and said first tab is secured to said first mounting post and said second tab is secured to said second mounting post.

12. The actuator of claim 11 wherein said position sensor voltage source is wired to said first conductive tab.

13. The actuator of claim 12 wherein said rotating capacitive plate moves between a fully disengaged position and a fully engaged position wherein the engaged position is rotated in the range of 13.5 degrees to 35 degrees from the disengaged position.

14. The actuator of claim 13 wherein the fully engaged position of the rotating capacitive plate is rotated 20 degrees from the disengaged position.

15. The actuator of claim 13 wherein said rotating capacitive plate is sourced by said voltage source and said stationary capacitive plate is sensed, and wherein a range of capacitance values are created dependent upon the position of said rotating plate with respect to said stationary plate.

16. The actuator of claim 15 further comprising a non-conductive bushing positioned between said valve shaft and said rotating capacitive plate and a second non-conductive bushing positioned between said valve shaft and said stationary capacitive plate.

17. The actuator of claim 16 further comprising a first ring terminal positioned between said first end of said first shape memory alloy actuation wire and said valve shaft and a second ring terminal positioned between said first end of said second shape memory alloy actuation wire and said valve shaft.

18. The actuator of claim 17 further comprising an O-ring positioned around said valve shaft adjacent to said reservoir.

19. A viscous fan clutch for cooling a vehicle engine, the fan clutch comprising:
   a controller;
   an engine parameter sensor connected to the engine and in communication with said controller;
   a voltage source connected to and in communication with said controller;
   a current source connected to and in communication with said controller;
   an input shaft rotating in sync with the engine;
   a clutch plate attached to said input shaft and rotating at approximately the speed of said input shaft, wherein said clutch plate includes a work area defined by a set of lans and grooves;
   a bearing attached to said input shaft;
   a fan drive body attached to said bearing;
   a fan drive cover attached to said fan drive body;
   a fan speed sensor connected to said fan drive body and in communication with said controller;
   a fluid reservoir contained within said fan drive cover and having a fill hole;
   a viscous fluid contained within said fluid reservoir;
   a valve arm rotatable to a position in the range from a filly closed position and a fully open position, wherein said valve arm is covering said fill hole in said closed position preventing said viscous fluid from flowing through said fill hole and said valve arm is not covering said fill hole in said fully open position allowing said viscous fluid to flow from said reservoir through said fill hole to said work area to engage clutch;
   a valve shaft fixedly attached to said valve arm and rotatable about an axis of rotation;
   a position sensor for detecting the position of said valve arm that is connected to and in communication with said controller, wherein said position sensor includes a stationary capacitive plate fixedly attached to said fan drive cover and a rotating capacitive plate fixedly attached to said valve shaft and that rotates with respect to said stationary capacitive plate; a first mounting post attached to said fan drive cover;
   a second mounting post attached to said fan drive cover and positioned 180 degrees from said first mounting post;
   a first shape memory alloy actuation wire having a first end and a second end wherein said first end is connected to said valve shaft and said second end is connected to said first mounting post and said current source; and
   a second shape memory alloy actuation wire having a first end and a second end wherein said first end is connected to said valve shaft and said second end is connected to said second mounting post and said current source.

20. The viscous fan clutch of claim 19 wherein said first shape memory alloy actuation wire is movable between an activated length when subjected to an electrical current and a deactivated length when not subjected to an electrical current wherein said activated length is less than said deactivated length; and said second shape memory alloy actuation wire is movable between an activated length when subjected to an electrical current and a deactivated length when not subjected to an electrical current wherein said activated length is less than said deactivated length.

21. The viscous fan clutch of claim 20 wherein said first and second shape memory alloy actuation wires force said valve shaft and said valve arm to rotate between a range of positions between the valve arm fully closed position and the valve arm fully open position when subjected to varying electrical currents.

22. A method of actuating a viscous fan clutch with two shape memory alloy actuation wires, the method comprising the steps of:
   measuring actual engine parameter information;
   communicating said actual engine parameter information to a controller;
   the controller determining a desired fan speed based on said actual engine parameter information;
   measuring an actual fan speed with a fan speed sensor;
   communicating said actual fan speed to the controller;
   the controller determining a fan speed error between said actual fan speed and the desired fan speed;
   the controller analyzing said fan speed error to calculate a desired valve arm position;
   measuring an actual valve arm position with a position sensor;
   communicating said actual valve arm position to the controller;
   the controller determining a valve position error between said actual valve arm position and said desired valve arm position;
   the controller determining an amount of current based on said valve position error to send to a first shape memory alloy actuation wire and to a second shape memory alloy actuation wire;
   the controller sending current to said first shape memory alloy actuation wire to change its length and to said second shape memory alloy actuation wire to change its length; and
   the valve arm either opening more to allow more fluid into a work area and forcing the fan to rotate faster or the valve arm closing more to allow less fluid into the work are and forcing the fan to rotate slower.

23. The method of claim 22 wherein the engine parameter information is the engine temperature.

24. The method of claim 23 wherein the fan speed sensor is located in a slip ring positioned on said actuator.

* * * * *

UNITED STATES PATENT AND TRADEMARK OFFICE
CERTIFICATE OF CORRECTION

PATENT NO.           : 7,503,444 B2
APPLICATION NO.      : 11/307807
DATED                : March 17, 2009
INVENTOR(S)          : Stephen M. Bohan It is certified that error appears in the above-identified patent and that said Letters Patent is hereby corrected as shown below:

Column 9, Line 41, Claim 19: "from a filly" should read -- from a fully --
Column 10, Line 26, Claim 22: "measuring actual" should read -- measuring the actual --

Signed and Sealed this
Twenty-first Day of February, 2012

David J. Kappos
*Director of the United States Patent and Trademark Office*